Patented Nov. 1, 1932

1,885,832

UNITED STATES PATENT OFFICE

ALPHONS O. JAEGER, OF CRAFTON, PENNSYLVANIA, ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE

CATALYTIC OXIDATION OF ANTHRACENE

No Drawing. Original application filed June 3, 1927, Serial No. 196,393, now Patent No. 1,709,583, dated April 23, 1929. Divided and this application filed March 24, 1928. Serial No. 264,571.

This invention relates to the catalytic oxidation of anthracene to anthraquinone in the vapor phase.

It has been proposed in the past to oxidize anthracene in the vapor phase admixed with air or other oxygen-containing gases by passing the mixture over contact masses containing metal elements of the fifth and sixth groups of the periodic system. The reaction is strongly exothermic and tends to get out of control resulting in over oxidation, in some cases reaching total combustion with serious loss in yield and uncertainty of the quality of the product produced.

The control is rendered all the more difficult by the fact that when the reaction proceeds too far over oxidation results in the evolution of largely increased quantities of heat which in turn tend to over accelerate the over oxidation so that the reaction in the presence of contact masses used hitherto may be considered to be in an unstable equilibrium and presents a very serious cooling problem. For this reason the catalytic vapor phase oxidation of anthracene to anthraquinone has met with little practical commercial success. Not only does the large evolution of heat which takes place when the reaction proceeds too far result in serious losses in yield or contamination of the product but the catalyst itself is frequently damaged by excessive temperatures which may cause surface sintering.

According to the present invention, catalysts or contact masses containing catalytic elements, whether diluted with carrier particles or undiluted, are associated with stabilizers, which prevent to a large extent undesired side reactions and permit a catalytic control which allows excellent yields and high outputs. The stabilizers used in the present invention are not to be considered as themselves catalysts. In fact, they are characterized by the fact that they contain basic radicals which in their basicity, valence or stability of their oxides at high temperatures toward oxidizing agents are radically different from the characteristics of the catalytic elements. The stabilizing elements which are usually present in the form of salts or other compounds are the alkali metals, the alkaline earth metals, some earth metals and other metals which form oxides which are not reducible my hydrogen, all of which elements will be referred to in the present invention as stabilizer forming metals. The salts or other compounds of these stabilizing elements produce a very desirable stabilizing effect, and practically any of the salts can be used which do not contain acid radicals having a deleterious effect upon the particular reaction in which the catalyst is to be utilized. Thus, for example, the acid or neutral sulfates, phosphates, halides, chlorates, nitrates, cyanides, both simple and complex, arsenates, antimonates, bismuthates, borates, carbonates and the like give excellent results.

The stabilizers can be added to the catalysts or contact masses containing the catalysts in a chemically preformed state, or they may be produced by chemical reaction in the presence of the other components of the contact mass. Thus, for example, a stabilized vanadium pentoxide catalyst may be produced by adding potassium bisulfate in suitable amounts to vanadium oxide in any suitable manner, or a potassium vanadate catalyst can be caused to react with vapors containing sulfur trioxide or sulfur dioxide and air, or with dilute sulfuric acid, producing the vanadium oxide and potassium bisulfate in situ. In both cases, the potassium bisulfate will act as a stabilizer, but the action will not be the same as the physical arrangement of the molecules, and perhaps to a certain extent the chemical combination is different with different methods of producing a contact mass having the same empirical chemical composition, and the catalytic activity depends not only on the empirical chemical composition, but also on the physical arrangement and on the method of formation of the contact mass. Stabilizers can, of course, also be generated in situ by reaction of various acid bodies with stabilizer forming metal compounds of components other than the catalyst component of the contact masses.

The stabilizers can be introduced or formed in situ in any desired manner, and in the case of diluted catalysts may be incorporated into the ready formed diluted catalyst, or into a diluent or any of the catalysts or catalyst forming components before actual formation of the contact mass.

Another method of producing stabilized catalysts consists in incorporating catalytic components in carriers which themselves contain stabilizers or which contain compounds capable of forming stabilizers by subsequent treatment.

In the catalytic oxidation of anthracene to anthraquinone the presence of free alkali is undesirable in most contact masses and any free alkali present can be readily neutralized by treatment with acid gases as described in my prior Patent No. 1,678,627 dated July 24, 1928. This treatment transforms any alkali present into the alkali forming metal salts which act as non-alkaline stabilizers.

Any other suitable method of incorporating compounds of the stabilizer forming metals with catalysts or in contact masses may be used and are included in the present invention.

Diluting catalysts with finely divided or highly porous diluents is frequently desirable, and such diluted catalysts may be associated with stabilizers or stabilizers may be formed therein. It is not definitely known whether diluents of desirable physical structure have any influence on the effect of the stabilizers or not, since any effect on the stabilizer is probably masked by corresponding effects on the catalyst. Thus, diluents of high porosity or capillarity greatly increase the effectiveness of almost any catalyst and naturally, of course, increase the efficiency of any corresponding stabilized catalyst, but whether this added effectiveness is to be attributed partly to effects on the stabilizer or wholly to effects on the catalyst is difficult or impossible to prove and the present invention is not limited to any theories of action of diluents.

While all of the alkali forming metals may be used as stabilizers, I have found that stabilizers containing potassium give better results than do stabilizers containing sodium with many of the contact masses which can be stabilized by the present invention. It will be clear, of course, that the best stabilizer should be chosen for each catalyst.

It is not definitely known just how the stabilizer acts. I am of the opinion, however, that in many, if not most, catalytic oxidations of organic compounds the most important effect is to reduce its activity in total combustion. In the case of some vanadium oxide catalysts, the color shows that when sufficient stabilizers of suitable type are added, all of the vanadium is not continuously regenerated to vanadium pentoxide, as the catalyst shows various colors of blue, green and gray and does not remain yellow as is the case with an unstabilized vanadium oxide catalyst. Whether, however, this is the only effect of a stabilizer and whether this effect is true with all catalytic elements is not definitely determined and the present invention is not limited to any theory of action and it may well be that the stabilizer has other actions. It should be noted, however, that while in many cases the stabilizer appears to reduce the oxidation catalytic activity of the catalyst, it does not reduce the efficiency of the catalyst, but on the contrary, greatly increases the overall efficiency, that is to say, the output of the desired intermediate oxidation products per unit of catalyst per unit of time, and it may be that certain activities of the catalyst are actually enhanced and in fact this appears likely, because as has been stated above, all stabilizing elements are not equally effective in their reaction and it may well be that certain stabilizers actually enhance the catalytic power of the catalyst. While it is an advantage of the present invention that in many cases increased outputs are obtained with stabilized catalysts, the invention is in no sense limited to catalysts or processes in which the actual output is increased. In some cases, where extreme purity is desired, this can be obtained with a stabilized catalyst by reducing the loading and the advantages of the present invention can be enjoyed even though the properties of the catalysts of the present invention are not utilized all in one direction, namely, increasing the output. As in all catalytic reactions there is a certain compromise between purity of product and output, and the best compromise to be chosen in every case will be determined by the skilled catalytic chemist.

While it is advantageous in many cases to use an anthracene of high grade, it is one of the great advantages of the present invention that impure anthracene, such as crude anthracenes which may contain varying quantities of carbazole and phenanthrene as well as other impurities, may be oxidized to anthraquinone of good quality or to a product which contains a high percentage of anthraquinone readily separable from small amounts of by-products. By the choice of suitable stabilized catalysts it is possible to selectively burn out one or more of the components of the crude or impure anthracene. This is particularly true of carbazol, which can be almost quantitatively burned out without serious attack of the anthracene. Composite catalysts may be used which favor the total combustion of impurities and the production of anthraquinone or the process can be carried out in the presence of two different catalysts preferably arranged in zones, one being a combustion catalyst for the burning out of impurities and the other being a specific anthraquinone catalyst. The use of suitable stabilizers makes this catalytic purification combined with oxidation readily possible and is one of the most important features of the present invention, permitting as it does the use of anthracenes which had hitherto been considered worthless for catalytic oxidation to anthraquinone. When the catalytic oxidation is carried out together with or subsequent to catalytic combustion of impurities, it should be understood that stabilizers which are most effective for the anthraquinone oxidation catalysts are not necessarily the most effective for the burning out of impurities. Thus, for example, strongly alkaline stabilizers which are relatively less efficient for the oxidation of anthracene are among the most efficient for the catalytic combustion of carbazole and similar impurities. In a combined process, therefore, it may be necessary to use a compromise contact mass which contains stabilizers, which perhaps are not the most effective for anthraquinone but which are fairly effective for the production of anthraquinone and also tend to favor the catalytic combustion of impurities. The best compromise will depend on the nature of the crude anthracene used and the nature of the contact mass chosen. Of course where the process is carried out in two stages, as for example when two different catalysts are arranged in zones, no problem is presented and the stabilizers best suited for each step can be present in the contact mass used for that step.

Stabilized catalysts when used in oxidation reactions according to the present invention bring about remarkably improved results, and in many cases a stabilizer alone is sufficient. I have found, however, that the addition of other chemical compounds possessing catalytic activity, but not being specific catalysts for the particular reaction, appears to enhance the effect of the stabilizer and to tune it for more perfect results for the individual reactions. These compounds will be referred to as stabilizer promoters without thereby limiting the invention to any particular theory of action as it may be that the stabilizer promoters do not act directly on the stabilizer itself. Among the stabilizer promoters are the usual catalytic compounds containing the usual catalytic elements and particularly heavy metals and some amphoteric metals, such as aluminum, zinc, lead and the like. In general, of course, any catalytic element which is not a specific catalyst for the reaction in question may, when combined with a stabilized catalyst for that reaction, act as a stabilizer promoter. Among the most effective stabilizer promoters are, however, some of the catalytic elements which are by themselves relatively mild catalysts and the effect of the stabilizer promoter is not a pure additive one based on the catalytic power of the elements present in the stabilizer promoter. On the contrary, the results tend to indicate that there is a definite cooperation between the stabilizer promoter and the stabilizer catalysts and in some cases, the addition of stabilizer promoters produces results greatly in excess of those which would be predicted from the known catalytic power of the promoter elements themselves.

Stabilizer promoters may be added in a chemically preformed state or formed in situ as has been described in the case of stabilizers, and the forms of introduction may take place in any suitable manner, as will be apparent to the skilled chemist. It is, however, by no means necessary that the stabilizer promoters should be present as separate chemical compounds and on the contrary, many very effective catalysts may be produced by the addition of compounds of the stabilizing forming metals with various stabilizer promoter elements. Thus, for example, the various alkali metal metallates form excellent composite stabilizers and stabilizer promoters. It is possible, of course, that during reaction these compounds break up to a certain extent, and perhaps even in such cases the stabilizer becomes completely dissociated from the stabilizer promoter. It is impossible, however, to determine just what takes place within the catalyst during catalysis, and I do not wish to limit my invention to any theory.

In addition to stabilizers and stabilizer promoters, which are present or are introduced as individual chemical compounds or combined chemically with each other, the stabilizer promoters may be present in chemical combination with various diluents. Thus, for example, many heavy or other metal silicates form at the same time excellent diluents and stabilizer promoters. Notable examples of these compounds are various zeolites in which heavy metal or other elements are present in exchangeable or non-exchangeable form. These zeolites, and, in fact, base exchanging bodies generally, whether zeolites or non-silicious base exchange bodies, possess for the most part a microporous structure which is excellently suited as a catalyst diluent or as a framework in or on which catalytically active elements may be hung. Such base exchange bodies permit in some cases also a chemical combination between the stabilizer, stabilizer promoter and the catalyst itself. Thus, for example, a zeolite or other base exchange body may contain a catalytically active element and also a heavy metal or an amphoteric metal oxide associated with stabilizers. Such catalysts are among the most efficient for the oxidation of organic compounds and are of course included as one of the important classes of the present invention. The formation of these zeolites or other base exchange bodies, whether containing catalytically active elements in chemical combination or not, is described in the co-pending application of myself and Johann A. Bertsch, Serial No. 95,771, filed March 18, 1926 and Patent No. 1,701,075 dated February 5, 1929, and in my prior Patent No. 1,728,732, dated September 17, 1929, Patent No. 1,782,353, dated November 18, 1930, and Patent No. 1,694,620 dated December 11, 1928, and any of the methods of formation therein set forth may be used to produce base exchange bodies containing stabilizers or stabilizers and stabilizer promoters for use in the oxidation of anthracene according to the present invention.

The invention is not limited, of course, to the use of any particular diluent, but diluents of high porosity and high capillarity greatly enhance the effectiveness of the contact mass used. The action of the diluents, particularly the porous diluents appears to be primarily due to their physical characteristics. Catalytically active components which are not catalysts for the particular reaction are classified under stabilizer promoters, although, of course, it is difficult in some extreme cases to draw a line between diluents and stabilizer promoters in the case of certain compounds which appear to have weak catalytic activity which may be due to their physical or to their chemical characteristics. In general, however, where components which do not possess fairly high catalytic activity, as a result of their chemical structure, they are to be classed as diluents rather than stabilizer promoters.

The invention will be described in greater detail in connection with the following specific examples but is not limited to the exact details therein set forth although in its more specific aspects the more specific features of the examples are included.

*Example 1*

50 parts of colloidal silicic acid and 60 parts of comminuted pumice are thoroughly mixed and treated with 25 parts of freshly precipitated ferric vanadate, 5 parts of potassium sulfate, 2 parts of potassium chlorate, 2 parts of lithium carbonate and one part of potassium cyanide dissolved or suspended in 80 parts of water. The ferric vanadate may advantageously contain 10 percent excess of ferric oxide. The mass is formed into granules, dried and calcined at a temperature of 400° C., and forms a catalyst which can be effectively used for the catalytic oxidation of anthracene to anthraquinone and acenaphthene to naphthalic anhydride when the vapors of either hydrocarbon mixed with a great excess of air are passed over the contact mass at 330–400° C.

After the catalyst has become spent from use it can be readily reactivated by means of oxides of nitrogen or by spraying with dilute nitric acid.

*Example 2*

60 parts of kieselguhr are mixed with a solution containing 12 parts of potassium vanado-molybdate in 60 parts of water and mixed with a suspension containing 6 parts of ferric pyrovanadate in suspension. 8 parts of KOH in 25 parts of water are then added and the mass produced is formed into granules, dried, calcined at 400° C., and then subjected to a subsequent treatment of burner gases at 400–500° C., until all the alkali is transformed into the sulfate or bisulfate. The contact mass is then blown with air until acid gases no longer escape, and is then suited to a contact mass for the catalytic oxidation of anthracene to anthraquinone under the reaction conditions described in the foregoing example.

*Example 3*

280 parts of pumice meal or comminuted asbestos fibers are treated with 2 percent of its weight of manganese sulfate containing 2 mols of water which is introduced in the form of a 10% aqueous solution. A 10% solution of caustic alkali is then added, precipitating the manganese oxide in a finely divided condition. The impregnated pumice is then stirred into a 33° Bé. waterglass solution containing about 24 to 30 parts of $SiO_2$, the solution having been previously diluted with about 5 to 6 volumes of water. 9 parts of $V_2O_5$ are dissolved in a normal sodium hydroxide solution to form a sodium vanadate solution containing sufficient sodium hydroxide to cause the solution to react strongly alkaline to litmus. To this solution 16 parts of $Fe_2O_3$ in the form of a 10 percent ferric sulfate solution are added to precipitate ferric vanadate mixed with ferric oxide.

18 parts of $V_2O_5$ are mixed with 2 percent of their weight of concentrated sulfuric acid and then diluted with 20 parts by weight of water. The suspension is boiled quietly and $SO_2$ containing gases are passed in until a clear blue solution of vanadyl sulfate is formed. The blue solution is then gradually treated with 10N sodium hydroxide solution, which first precipitates out vanadyl hydroxide and then dissolves up the precipitate to form a clear coffee-brown solution of sodium vanadite. The waterglass suspension and the ferric vanadate-ferric oxide $MnO_2$ suspensions are poured together and the vanadite solution added with vigorous agitation. The major part of the excess alkali is neutralized with 10 percent sulfuric acid or 5 per cent nitric acid, or a mixture of both, and the gelatinous product formed is pressed, washed two or three times with 200 parts of water and dried at temperatures below 100° C. The product is a zeolite-like sodium-vanadyl polysilicate diluted with pumice meal or asbestos fibres and containing ferric vanadate, ferric oxide and manganese oxide in a fine state of subdivision. The stabilizer in this product is present in the form of a complex compound.

$Fe_2O_3$ and $MnO_2$ act as stabilizer promoters.

The contact mass described is well suited for the oxidation of anthracene and its derivatives to the corresponding anthraquinones, the vapors of the anthracene compounds mixed with air in the proportion of 1 to 30 by weight being passed over the contact mass at 330–420° C.

Example 4

One mol of ammonium vanadate suspended in 300 parts of water is treated with sulfur dioxide at an elevated temperature, producing a solution of the greenish blue vanadyl salt. The excess $SO_2$ is then removed by boiling. One mol of a 10 percent solution of copper sulfate is dissolved up in sufficient 25 percent ammonia to form a deep blue cuprammonium sulfate solution. 10 mols of $SiO_2$ in the form of an ammoniacal 33° Bé. potassium or sodium waterglass solution are diluted with 10 volumes of water and sufficient cellite or pumice meal is stirred in to produce a suspension which is just stirrable. The vanadyl sulfate and cuprammonium sulfate solutions are then poured into the waterglass suspension heated up to about 65° C. In order to accelerate the precipitation of the gel, dilute sulfuric acid may be added cautiously until the mixture is weakly alkaline to phenolphthalein. After pressing in the usual manner the sodium ammonium vanadyl copper zeolite produced can be treated with acids and is suitable for the catalytic oxidation of anthracene to anthraquinone.

Example 5

An iron zeolite is prepared by fusing 15.9 parts of $Fe_2O_3$, 20–30 parts of $SiO_2$ and 40 parts of $K_2CO_3$ in an iron crucible, adding sufficient borax until the mixture sinters or becomes completely molten. The cool product broken into fragments and washed two or three times with 200 parts of water, which produces hydration, is then sprayed with a solution containing 6 to 8 parts of ammonium vanadate dissolved in hot water. After calcining and subsequent treatment with acid such as dilute sulfuric or nitric acid, this contact mass is well suited for the catalytic oxidation of anthracene to anthraquinone when anthracene vapors mixed with air in the proportion of air of 1 to 30 are passed over the contact mass at 340–380° C.

Example 6

36 parts of $V_2O_5$ are suspended in 900 parts of water, 33.6 parts of 100% KOH are added and the mixture warmed to 60–70° C. with vigorous agitation, which is continued until the solution is complete. 290 parts of celite or glaucosil are stirred in and the product made neutral to litmus with 2 mols of sulfuric acid. Thereupon a solution containing 52.8 parts of ferric sulfate in 300 parts of water is added. The reaction product obtained is sucked, washed with about 1500 parts of water, dried and then pulverized. 88.8 parts of aluminum sulfate with 18 mols of water are dissolved in 600 parts of water and 450 volume parts of 2N potassium hydroxide solution is added with vigorous agitation, precipitating out aluminum hydroxide, which is filtered and then washed with about 800 parts of water. The wet aluminum hydroxide is then dissolved up in a solution containing about 50.7 parts of 100% KOH in 60 parts of water. The diluted iron vanadate is mixed with potassium aluminate solution and 125 parts of 33° Bé. potassium waterglass is added, forming a moist mass which is easily formed into fragments. The fragments are then dried cautiously at about 80° C. in a stream of carbon dioxide and air producing an aluminum zeolite in which the catalytically effective material is embedded in the form of a diluent.

The contact mass is calcined at 400° C. and is then placed in a converter. 25–35% crude anthracene is vaporized and the vapors mixed with air in the proportion of 1 to 20 by weight are passed over the catalyst at 330–350° C. The resulting reaction product contains 75–85% of anthracene together with unimportant amounts of anthraquinone, traces of carbazole and small amounts of phenanthrene. The yields based on the weight of crude anthracene are very high.

The composite reaction product can be used directly for the catalytic oxidation of anthracene to anthraquinone or by a single recrystallization from solvent naphtha can be transformed into 90–95% anthracene, which can be used for catalytic oxidation or for the chromic acid oxidation of anthracene to anthraquinone.

In the composite contact mass described, the stabilizer and stabilizer promoter form parts of the zeolite, the alkali acting as a stabilizer and the aluminum oxide acting as stabilizer promoter.

Instead of iron vanadate, other vanadates can be used singly or in mixture, for example, manganese, silver or copper vanadates. The aluminum zeolite may be replaced with other zeolite compositions which combine stabilizers and stabilizer promoters.

If this catalytic composition is given a preliminary treatment with acids, e. g. diluted $H_2SO_4$, in order to form the salt-like body of the zeolite, 25 to 35% crude anthracene in the vapor phase mixed with air in the ratio 1:20 by weight at 350 to 370° C. can easily be converted to crude anthraquinone containing 70 to 78% anthraquinone. The yield is very good.

This application is a division of my application Serial No. 196,393, filed June 3, 1927, which matured into Patent No. 1,709,583 dated April 23, 1929.

What is claimed as new is:

1. A method of oxidizing anthracene containing materials to anthraquinone, which comprises causing the anthracene containing materials in the vapor phase to react with an oxidizing gas at reaction temperatures in the presence of a contact mass having associated therewith at least one compound of an element falling within the group consisting of alkali metals, alkaline earth metals.

2. A method of oxidizing anthracene containing materials to anthraquinone, which comprises causing the anthracene containing materials in the vapor phase to react with an oxidizing gas at reaction temperatures in the presence of a contact mass having associated therewith at least one compound of an element falling within the group consisting of alkali metals, alkaline earth metals and at least one solid catalyst included in the group consisting of hydrogenation catalysts, dehydrogenation catalysts, reduction catalysts, oxidation catalysts which, when used alone, are not specific catalysts for the oxidation of anthracene to anthraquinone.

3. A method of oxidizing anthracene containing materials to anthraquinone, which comprises causing the anthracene containing materials in the vapor phase to react with an oxidizing gas at reaction temperatures in the presence of a contact mass containing a compound of an element falling within the group consisting of alkali metals, alkaline earth metals and also containing an oxygen compound of vanadium as at least one of its catalytically effective components.

4. A method of oxidizing anthracene containing materials to anthraquinone, which comprises causing the anthracene containing materials in the vapor phase to react with an oxidizing gas at reaction temperatures in the presence of a contact mass containing a compound of an element falling within the group consisting of alkali metals, alkaline earth metals and also containing a vanadate as at least one of its catalytically effective components.

5. A method of oxidizing anthracene containing materials to anthraquinone, which comprises causing the anthracene containing materials in the vapor phase to react with an oxidizing gas at reaction temperatures in the presence of a contact mass containing a compound of an element falling within the group consisting of alkali metals, alkaline earth metals and also containing an oxygen compound of iron vanadate as at least one of its catalytically effective components.

6. A method of oxidizing impure anthracene to anthraquinone with concomitant combustion of at least part of the impurities which comprises vaporizing the anthracene and passing the vapors admixed with an oxidizing gas at reaction temperatures over a contact mass containing at least one compound of an element falling within the group consisting of alkali metals, alkaline earth metals and favoring total combustion of impurities.

7. A method of oxidizing anthracene containing materials to anthraquinone, which comprises causing the anthracene containing materials in the vapor phase to react with an oxidizing gas at reaction temperatures in the presence of a contact mass for the vapor phase catalytic oxidation of anthracene to anthraquinone, having associated therewith at least one potassium compound.

8. A method of oxidizing anthracene to anthraquinone, which comprises vaporizing anthracene and causing the vapors to react with an oxidizing gas at reaction temperatures in the presence of a contact mass containing at least one zeolite which is the reaction product of at least one silicate, at least one metallate and at least one salt, the basic radical of which is a metal capable of entering into the non-exchangeable nucleus of a zeolite, the contact mass also containing at least one compound of an element falling within the group consisting of alkali metals, alkaline earth metals.

9. A method of oxidizing anthracene to anthraquinone, which comprises vaporizing anthracene and causing the vapors to react with an oxidizing gas at reaction temperatures in the presence of a contact mass containing at least one zeolite which is the reaction product of at least one silicate, at least one metallate and at least one salt, the basic radical of which is a metal capable of entering into the non-exchangeable nucleus of a zeolite, the contact mass also containing at least one compound of an element falling within the group consisting of alkali metals, alkaline earth metals, and at least one catalyst included in the group consisting of hydrogenation catalysts, dehydrogenation catalysts, reduction catalysts, oxidation catalysts which, when used alone, are not specific catalysts for the oxidation of anthracene to anthraquinone.

10. A method of oxidizing anthracene to anthraquinone, which comprises vaporizing anthracene and causing the vapors to react with an oxidizing gas at reaction temperatures in the presence of a contact mass containing at least one zeolite which is the reaction product of at least one silicate, at least one metallate and at least one salt, the basic radical of which is a metal capable of entering into the non-exchangeable nucleus of a zeolite, at least one compound of an element falling within the group consisting of alkali metals, alkaline earth metals chemically combined in the zeolite.

11. A method of oxidizing anthracene to anthraquinone, which comprises vaporizing anthracene and causing the vapors to react with an oxidizing gas at reaction temperatures in the presence of a contact mass containing at least one zeolite which is the reaction product of at least one silicate, at least one metallate and at least one salt, the basic radical of which is a metal capable of entering into the non-exchangeable nucleus of a zeolite, at least one compound of an element falling within the group consisting of alkali metals, alkaline earth metals, and at least one catalyst included in the group consisting of hydrogenation catalysts, dehydrogenation catalysts, reduction catalysts, oxidation catalysts which, when used alone, are not specific catalysts for the oxidation of anthracene to anthraquinone, chemically combined in or with the zeolite.

12. A method of oxidizing anthracene to anthraquinone, which comprises vaporizing anthracene and causing the vapors to react with an oxidizing gas at reaction temperatures in the presence of a contact mass containing at least one zeolite which is the reaction product of at least one silicate, at least one metallate and at least one salt, the basic radical of which is a metal capable of entering into the non-exchangeable nucleus of a zeolite, at least one compound of an element falling within the group consisting of alkali metals, alkaline earth metals, and at least one catalyst included in the group consisting of hydrogenation catalysts, dehydrogenation catalysts, reduction catalysts, oxidation catalysts which, when used alone, are not specific catalysts for the oxidation of anthracene to anthraquinone, chemically combined in or with the zeolite in non-exchangeable form.

13. A method according to claim 8, in which the associated compound is a non-alkaline compound of potassium.

14. A method according to claim 8, in which the associated compound is formed in situ by treating the contact mass with acid gases.

Signed at Pittsburgh, Pa., this 21st day of March, 1928.

ALPHONS O. JAEGER.